(12) United States Patent
Maslakow

(10) Patent No.: US 10,501,190 B2
(45) Date of Patent: Dec. 10, 2019

(54) METHOD FOR HOMOGENOUS THERMOPLASTIC SEAT BACK ASSEMBLY

(71) Applicant: Reliant Worldwide Plastics, LLC, Plano, TX (US)

(72) Inventor: William H. Maslakow, Plano, TX (US)

(73) Assignee: RELIANT WORLDWIDE PLASTICS, LLC, Plano, TX (US)

( * ) Notice: Subject to any disclaimer, the term of this patent is extended or adjusted under 35 U.S.C. 154(b) by 0 days.

(21) Appl. No.: 15/921,423

(22) Filed: Mar. 14, 2018

(65) Prior Publication Data

US 2018/0273184 A1    Sep. 27, 2018

Related U.S. Application Data

(62) Division of application No. 14/703,208, filed on May 4, 2015, now Pat. No. 9,950,797.

(60) Provisional application No. 61/988,080, filed on May 2, 2014.

(51) Int. Cl.
| | |
|---|---|
| *B64D 11/06* | (2006.01) |
| *B29C 45/14* | (2006.01) |
| *B60N 2/64* | (2006.01) |
| *B60N 2/68* | (2006.01) |
| *B29K 703/00* | (2006.01) |
| *B29L 31/00* | (2006.01) |

(52) U.S. Cl.
CPC .... *B64D 11/0649* (2014.12); *B29C 45/14311* (2013.01); *B29C 45/14786* (2013.01); *B60N 2/64* (2013.01); *B60N 2/68* (2013.01); *B60N 2/682* (2013.01); *B60N 2/686* (2013.01); *B64D 11/0647* (2014.12); *B29C 2045/14319* (2013.01); *B29K 2703/00* (2013.01); *B29L 2031/771* (2013.01); *Y02T 50/46* (2013.01)

(58) Field of Classification Search
None
See application file for complete search history.

(56) References Cited

U.S. PATENT DOCUMENTS

| | | | | |
|---|---|---|---|---|
| 2011/0316320 A1* | 12/2011 | Kulkarni | ................ | B60N 2/682 297/452.48 |
| 2012/0181839 A1* | 7/2012 | Michalak | ................ | B60N 2/686 297/452.1 |
| 2013/0320742 A1* | 12/2013 | Murolo | .................... | B60N 2/68 297/452.18 |
| 2014/0077531 A1* | 3/2014 | Preisler | .................... | B60N 2/91 296/193.07 |

* cited by examiner

*Primary Examiner* — Benjamin A Schiffman
(74) *Attorney, Agent, or Firm* — Braxton Perrone, PLLC

(57) ABSTRACT

A seat back assembly that includes a composite seat back cover. The composite seat back cover includes at least one composite layer, that includes a layer of reinforcing fibers and a thermoplastic layer surrounding the reinforcing fibers. The thermoplastic layer is coextensive with the layer of reinforcing fibers. In various embodiments, the seat back includes a seat back frame. The seat back frame includes a side rail, a top rail main section, and a top rail cap. The side rail, the top rail main section, and the top rail cap are fused to each other by a homogenous chemical bond. A homogenous chemical bond is formed between the seat back cover and the seat back frame creating a unitary seat back assembly.

9 Claims, 12 Drawing Sheets

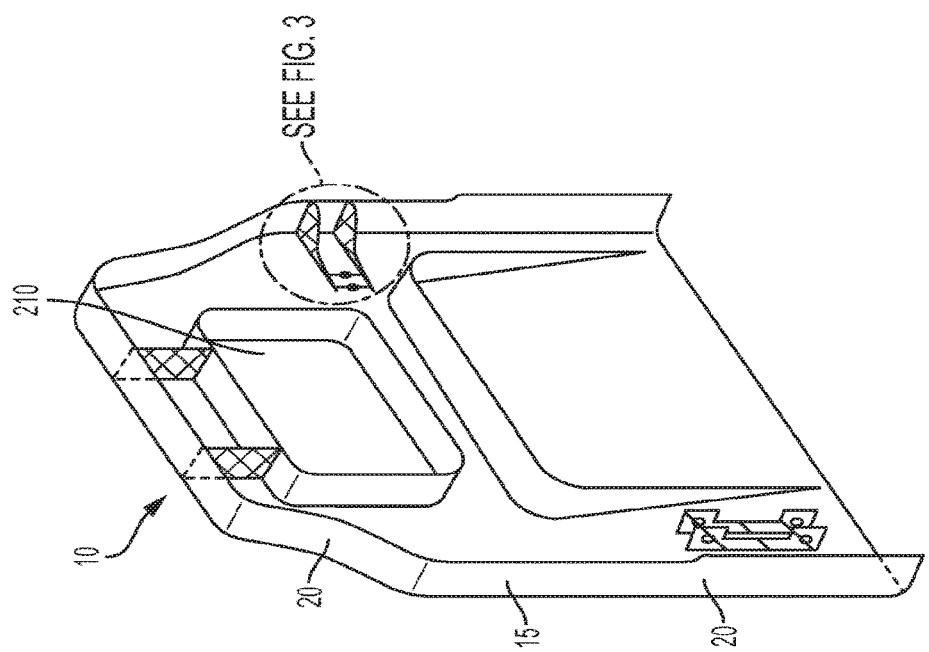
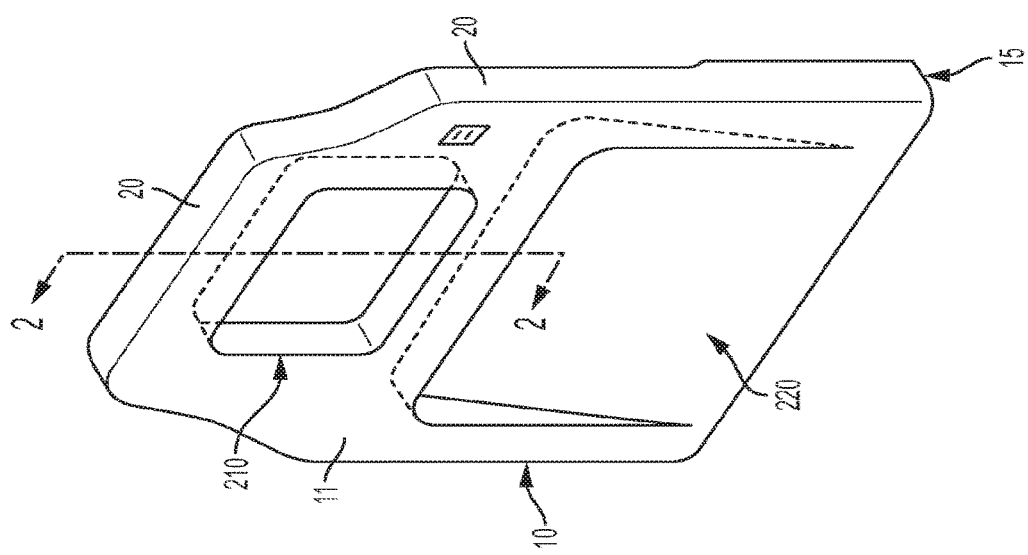

METHOD FOR HOMOGENOUS THERMOPLASTIC SEAT BACK ASSEMBLY

CROSS-REFERENCE TO RELATED APPLICATIONS

This application is a divisional of U.S. Non-Provisional patent application Ser. No. 14/703,208, filed May 4, 2015 which claims priority to U.S. Provisional Patent Application No. 62/988,080, filed May 2, 2014, both of which are incorporated herein by reference.

BACKGROUND

Field of the Invention

The present application relates generally to seats for commercial aircraft and more particular, but not by way of limitation, to a unitary seat back assembly formed via homogenous chemical bonding of thermoplastic components.

History of the Related Art

In the commercial aircraft industry, weight and safety are important issues. Even non-structural and non-critical elements like a seat back on a commercial aircraft are designed with these issues in mind. For example, a weight savings on each seat back can add up to significant weight savings for the aircraft as a whole due, in no small part to the large number of seats. The weight saving in turn may reduce then fuel expenditure and provide a cost savings. In the specific case of seat backs, any such weight reduction must not adversely affect strength. Typically, governmental rules and regulations specify strength requirements for aircraft elements, and at the very least, strength issues may impact durability and expected lifespan of an element, such as a seat back. Cost is also a driving factor in the commercial aircraft industry, so low-cost manufacturing techniques may be important as well. Disclosed embodiments herein relate to improved seat-back embodiments that may address one or more of these issues.

SUMMARY

The present application relates generally to seats for commercial aircraft and more particular, but not by way of limitation, to a unitary seat back assembly formed via homogenous chemical bonding of thermoplastic components. In one aspect, the present invention relates to a seat back. In various embodiments, the seat back includes a composite seat back cover. The composite seat back cover includes at least one composite layer, that includes a layer of reinforcing fibers and a thermoplastic layer surrounding the reinforcing fibers. The thermoplastic layer is coextensive with the layer of reinforcing fibers. In various embodiments, the seat back includes a seat back frame. The seat back frame includes a side rail, a top rail main section, and a top rail cap. The side rail, the top rail main section, and the top rail cap are fused to each other by a homogenous chemical bond. A homogenous chemical bond is formed between the seat back cover and the seat back frame creating a unitary seat back assembly.

In another aspect, the present invention relates to a method of forming a thermoplastic homogenous seat back. In various embodiments, the method includes forming a thermoplastic seat back cover and assembling a thermoplastic seat back frame. The seat back frame is arranged on the seat back cover. A homogenous chemical bond is formed between the seat back cover and the seat back frame creating a unitary seat back assembly.

Disclosed embodiments generally may relate to an extension of concepts of embodiments previously disclosed in related provisional U.S. patent application 61/711,567 and related U.S. non-provisional patent application Ser. No. 14/048,840, entitled Thermoplastic Injection Molded Element with Integral Thermoplastic Positioning System for Reinforced Composite Structures, filed respectively Oct. 9, 2012 and Oct. 8, 2013, which are co-owned and hereby incorporated by reference to the extent it does not contradict the express disclosure herein. More specifically, disclosed embodiments may relate to seat-back embodiments formed using composite materials and/or thermoplastic molded (for example, injection molded) materials (such that disclosed embodiments might be a specific application and/or modification of the previous provisional patent technology).

Disclosed embodiments may relate to a thermoplastic composite passenger facing seat back assembly comprised of a thermally formed thermoplastic encapsulated carbon or glass reinforced composite element with integral homogeneous thermoplastic support and mounting elements. The passenger facing seat back assembly may be further comprised of at least one ply or layer of thermoplastic encapsulated unidirectional or weave carbon or glass reinforcement.

The passenger facing seat back assembly may be further comprised of integral thermally formed homogeneous thermoplastic support elements that provide at least a portion of the assemblies structural requirement and integral homogeneous thermoplastic mounting elements, for the installation of said passenger facing seat back to the main frame structure of a commercial airline seat assembly. The passenger facing seat back assembly may be further comprised of integral apertures to allow the installation of In-Flight Entertainment ("IFE") components such as an IFE monitor, or passenger communication devices such as a communication handset and passenger handheld device interface connectors. The passenger facing seat back assembly may be further comprised of integral mounting elements to allow the installation of single or bi-fold passenger tray table, and literature carrying devices. The passenger facing seat back assembly may further be comprised of an outer layer having a thermally integrated surface texture treatment that provide visual aesthetic and tactile value to the exposed surfaces of said passenger facing seat back assembly.

The passenger facing seat back assembly which may comply to FAR 25.853 and OSU55/55, may be comprised of at least one ply or layer of a textured thermally formed thermoplastic encapsulated unidirectional or weave carbon or glass reinforced composite with integral device apertures and integral homogeneous injection molded thermoplastic support elements that provide at least a portion of the seat assemblies structural requirements, and injection molded thermoplastic mounting elements for the installation of IFE and passenger communication devices, and installation of said passenger facing seat back assembly to the main frame structure of a commercial airline seat assembly. Disclosed embodiments may be comprised of chemical and molecular compatible thermoplastics resins throughout the assembly creating an infinite number of homogenous connective attachments that provide additional consistent strength, dimensional stability and rigidity.

Disclosed embodiments may meet FAR 25.853 and OSU55/55 throughout the passenger facing seat back assembly. Disclosed embodiments may provide increased mechanical load bearing capabilities provided by the integral formed thermoplastic carbon or glass reinforced composite element with the integral injection molded carbon or glass fiber reinforced thermoplastic support structure by the infinite number of homogeneous connective interfaces.

Disclosed embodiments may reduce part count and labor costs associated with the installation of required mounting elements by integrating said thermoplastic mounting elements onto the said passenger feeing seat back assembly. The integral formed thermoplastic encapsulated carbon or glass reinforced composite element may comprise multiple weave patterns, multiple layers and layer orientations to provide the optimum performance for the requirement load application. Disclosed embodiments may reduce the current weight of a comparable passenger facing seat back assembly by the use of high strength to weight ratio thermoplastic materials and composites. Disclosed embodiments may reduce manufacturing costs when compared to a thermoset epoxy composite seat frame assembly. Disclosed embodiments may eliminate the scrap rejections inherent to the current thermoset epoxy assemblies, including delamination and reinforcement disassociation.

Disclosed embodiments generally relate to seat backs for aircraft, for example for use on the main frame structure of a commercial airline seat assembly. Typically, disclosed seat back embodiments are formed of one or more layers of composite material. For example, in some embodiments, the seat back might comprise a composite seat back structure having one or more layers of composite material. Each layer of composite material typically has reinforcing fibers such as, for example, a weave of reinforcing fibers located internally, with thermoplastic surrounding it such as, for example, atop and below the fibers. In a typical embodiment, the composite material typically would have, for example, reinforcing fibers located internally, for example, in a central plane. When multiple layers of composite material such as, for example, the same composite material for each layer, each layer at least having the same thermoplastic material encapsulating or sheathing the reinforcing fibers form the seat back, the multiple layers of composite typically would be thermally and/or homogeneously joined or otherwise consolidated together to form a unitary structure with homogeneous connective interface throughout. Typically, the one or more layers of composite material are shaped into the form of a seat back, configured to cover and attach to the rear of the main frame structure of a commercial airline seat assembly. Such shaping includes formation of side flanges, formation of one or more apertures such as, for example, for in-flight entertainment screens, and formation of one or more recesses such as, for example for accepting or leaving space for a food tray or literature pocket. In various embodiments containing the one or more apertures, the composite material is formed inwardly towards an interior of the aircraft seat thereby creating a shelf of composite material that is recessed from the composite seat back. In a typical embodiment, the shelf is removed prior to installation of, for example, an in-flight entertainment system, a literature pocket, or other feature.

In some embodiments, additional elements such as, for example, mounting elements and structural support elements such as ribbing may also be formed on the joined composite material layers such as, for example, basic seat back structure. Typically, these elements are injection molded onto the composite material, and since the elements typically would be formed of the same thermoplastic as the composite material, the elements typically are thermally and homogeneously bonded to the composite material such as, for example, basic seat back structure. Specific embodiments related to the figures will be discussed in more detail below.

Composite material typically may comprise an array of reinforcing fibers such as, for example, carbon fibers, graphite fibers, and glass and aramid, perhaps typically with carbon microscopic crystals aligned parallel to the longitudinal axis of the carbon fibers. In a typical embodiment, the fibers are aligned in a precise orientation, and a thermoplastic material such as, for example, a sheathing is located about the array of reinforcing fibers. In some embodiments the sheathing may, for example, encapsulate the reinforcing fibers. The array of fibers may, in some embodiments, be a weave pattern such as, for example, a five harness satin weave. In other embodiments, the array of fibers may be aligned uni-directionally in a parallel linear pattern. In some embodiments, the composite might be provided in pre-defined solid three-dimensional geometries, such as a solid sheet, which can then be shaped according to the needs of the specific element such as, for example, by heat forming or cutting. Since such a composite material typically may be a rigid solid at room temperature, there would typically be no need for an external frame to hold the composite in the desired shape and/or position while forming encapsulating thermoplastic about the composite using injection molding in order to form any desired additional element. In other words, once the composite sheet material is shaped as desired for the particular seat back and has cooled to room temperature, it is a rigid solid that will independently hold the shape in question, and should not need any framework to hold its shape within the mold for forming thermoplastic elements onto the composite.

In other embodiments, the composite material might be formed by layering thermoplastic film and reinforcing fiber cloth or weave, which would then be consolidated such as, for example, via heat and/or compression into a unitary composite material with reinforcing fibers located between two thermoplastic layers. For example, each composite material layer might comprise two thermoplastic film layers sandwiching or surrounding a layer of reinforcing fiber. The one or more layers of composite might then be placed on a press mold for the shape of a seat back, with the press mold then being used to consolidate the one or more layers of composite, thereby forming the composite seat back structure.

Typically, the array of fibers of the composite material is located near the center of the composite material in a central plane, with thermoplastic material located atop and beneath the array of fibers. In other words, the composite material would typically have all of the reinforcing fibers located in a single/central plane, with the rest of the thickness of the composite material being formed of thermoplastic material. Regardless, the composite typically might provide approximately consistent fiber distribution and orientation in some embodiments throughout the element, so that it can provide precise and consistent/reproducible structural and/or mechanical support.

BRIEF DESCRIPTION OF THE DRAWINGS

For a more complete understanding of the present invention and for further objects and advantages thereof, reference may now be had to the following description taken in conjunction with the accompanying drawings in which:

FIG. 1C is a perspective view of a seat back cover, shown from an outward side, according to an exemplary embodiment;

FIG. 1D is a perspective view of a seat back cover, shown from an inward side, according to an exemplary embodiment;

DETAILED DESCRIPTION

Various embodiments of the present invention will now be described more fully with reference to the accompanying drawings. The invention may, however, be embodied in many different forms and should not be construed as limited to the embodiments set forth herein.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Figure 1A:
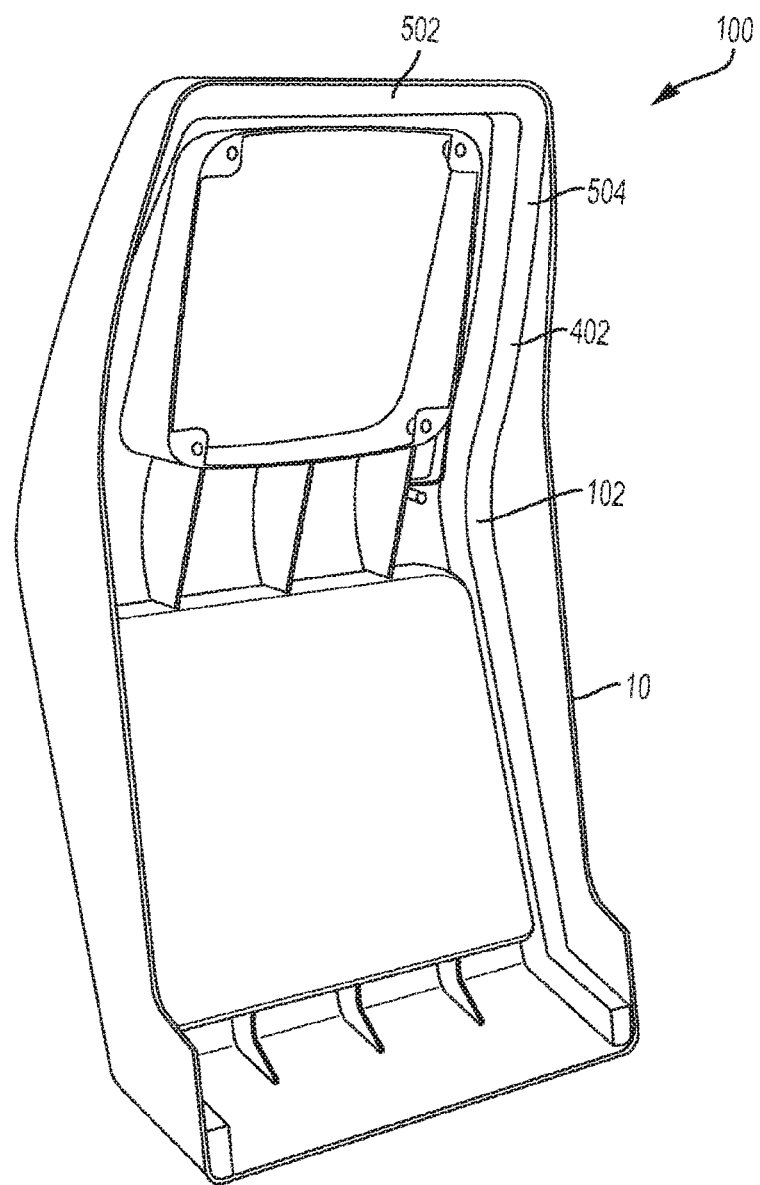
FIG. 1A is a perspective view of a seat back assembly according to an exemplary embodiment.
Figure 1B:
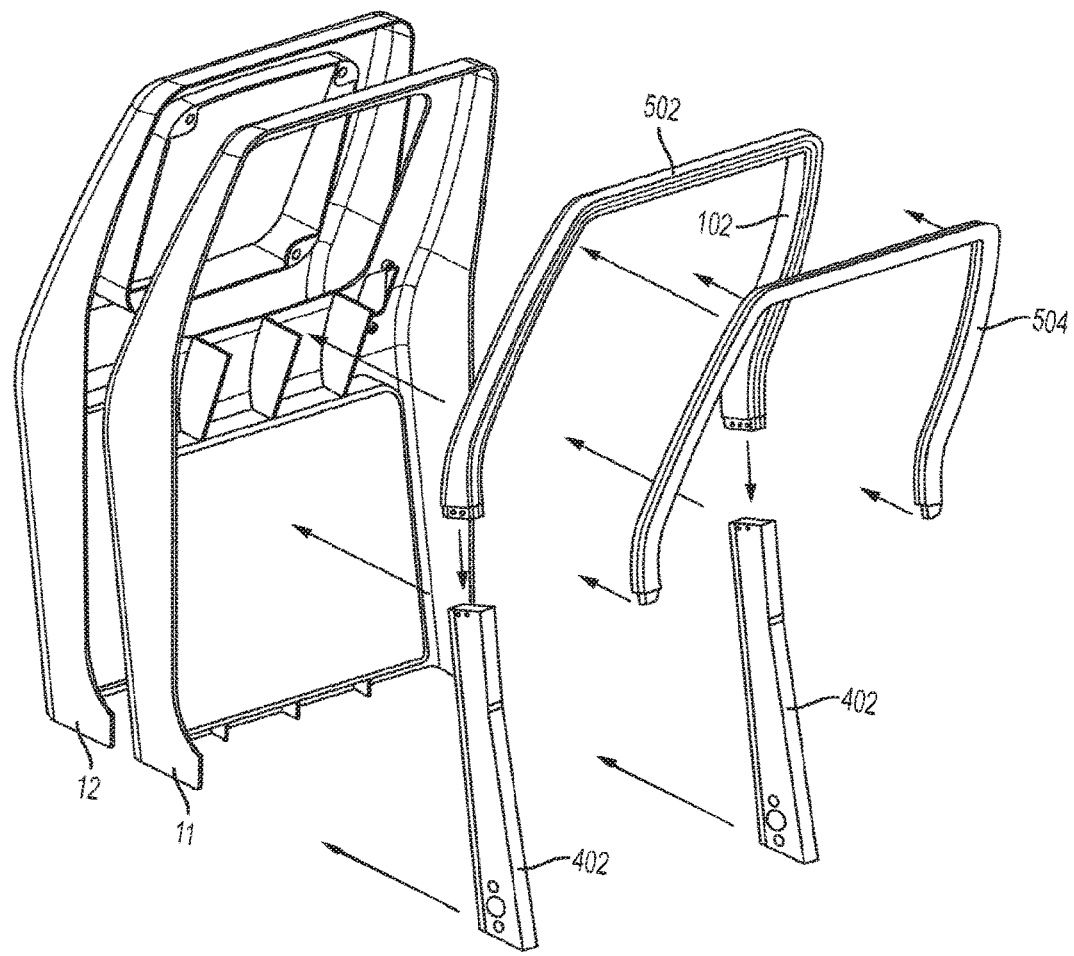
FIG. 1B is an exploded view of the seat back assembly of FIG. 1A according to an exemplary embodiment.

FIG. 1A is a perspective view of a seat back assembly 100. FIG. 1B is an exploded view of the seat back assembly 100. Referring to FIGS. 1A and 1B together, the seat back assembly 100 includes a seat back cover 10 and a unitary seat back frame 102. As illustrated in FIG. 1B, the seat back cover 10 includes a thermoplastic composite laminate 11 that is homogenously bonded to an outer layer 12. In a typical embodiment, the outer layer 12 has at least one of a color and a texture applied thereto. As will be discussed hereinbelow, the unitary seat back frame 102 includes a side rail 402, a U-shaped top main section 502, and a U-shaped top rail cap 504. In a typical embodiment, the side rail 402, the top rail main section 502 and the top rail cap 504 are chemically bonded to each other and to the seat back cover 10 such that the unitary seat back assembly 100 is formed. In a typical embodiment, the side rail 402, the top rail main section 502, and the top rail cap 504 are homogenously chemically bonded to each other and to the seat back cover. As will be discussed in more detail hereinbelow, the seat back cover, in a typical embodiment, is formed of a thermoplastic composite laminate.

FIGS. 1C and 1D illustrate an exemplary seat back cover 10 with a basic seat back structure 15, having an exterior face 11 and one or more side flanges 20. The one or more side flanges 20 typically surround the exterior face on at least three sides such as, for example, the top, left, and right. FIG. 1C shows a perspective view of the seat back cover 10 from an outward facing side and FIG. 1D shows a perspective view of the seat back cover 10 from an inward facing side. In FIG. 1C, the seat back cover 10 includes at least one optional aperture 210 such as, for example an in-flight screen aperture. Additionally, in FIG. 1C, the seat back cover 10 includes one or more recesses 220 such as, for example, a food tray/literature pocket recess. In a typical embodiment, the recesses 210,220 are formed using a press mold during consolidation, formation, and shaping of the composite seat back structure 15. In various embodiments, during formation of the apertures 210 and the recesses 220, the composite material is formed inwardly towards an interior of the seat-back cover 10 thereby creating a shelf of composite material that is recessed from the composite seat-back cover 10. In a typical embodiment, the shelf is removed prior to installation of, for example, an in-flight entertainment system, a literature pocket, or other feature. FIG. 1D illustrates the one or more side flanges 20, which side flanges 20 extend outward from an exterior surface 11 of the seat back cover 10. In a typical embodiment, the seat back cover 10 includes structural support elements such as, for example, ribbing and mounting elements. In a typical embodiment the mounting elements assist in attaching the seat back to at least one of the seat back frame 102 and the frame of the commercial airline seat assembly. FIGS. 1C and 1D illustrate an exemplary shape for the seat back cover 10.

Figure 2:
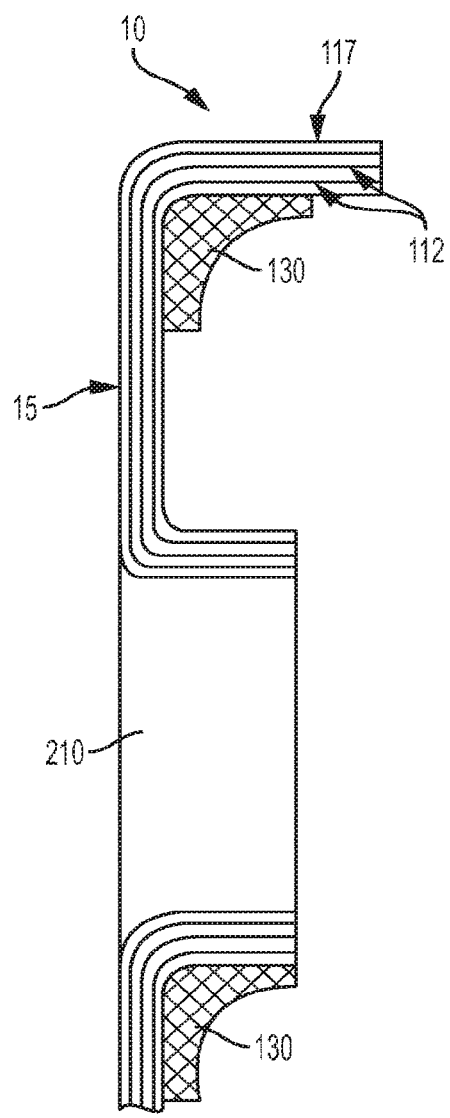
FIG. 2 is a cross-sectional view of the seat back cover of FIG. 1A according to an exemplary embodiment.

FIG. 2 illustrates a cross-sectional view of the seat back cover 10, showing in more detail an internal structure/makeup of the seat back cover 10. The seat back structure 15 is typically formed of multiple layers 110 of composite material which layers 110 have been joined together. The layers 110 of composite material are each formed of alternating layers of thermoplastic 114 and reinforcing fiber weave 112 such that each layer of reinforcing fibers 112 is located between thermoplastic layers 114. In a typical embodiment, the multiple layers of composite 110 are joined to form an integral whole such as, for example, by being heated and compressed in a press mold. In some embodiments, a pre-colored or textured outer thermoplastic layer 117 is joined to the exterior surface of the basic seat back structure 15 such as, for example, during consolidation. This outer thermoplastic layer 117 typically does not have any reinforcing fibers within it. Typically, the same thermoplastic material is used throughout the seat back cover 10. The pre-colored and textured outer thermoplastic layer 117 is sufficiently thick so that the reinforcing fibers 117 of the composite layers 110 beneath are not visible on the exterior surface 11 of the seat back cover 10.

Still referring to FIG. 2, at least one thermoplastic element 130 is affixed to an interior surface of the basic seat back structure 15. In a typical embodiment, the thermoplastic elements 130 are formed of the same thermoplastic material as the layers 110 of composite, allowing for a homogeneous chemical connection of the elements 130 to the composite structure 15. After formation of the basic composite seat back structure 15 via, for example, consolidation using a press mold, the thermoplastic elements 130 are formed onto the interior surface of the composite seat back structure 15 via injection molding. During injection molding, the pre-formed composite seat back structure 15 is placed in a mold for forming the thermoplastic elements 130 onto the composite seat back structure 15. Because the same thermoplastic material is used throughout the seat back 10, there is a homogeneous chemical interface between the thermoplastic elements 130 and the composite seat back structure 15 such that the thermoplastic support elements 130 are thermally and homogeneously affixed to the composite seat back structure 15. In some embodiments, one or more apertures 210 are formed in the composite seat back structure 15 such as, for example by cutting a hole in the composite material.

Figure 3:
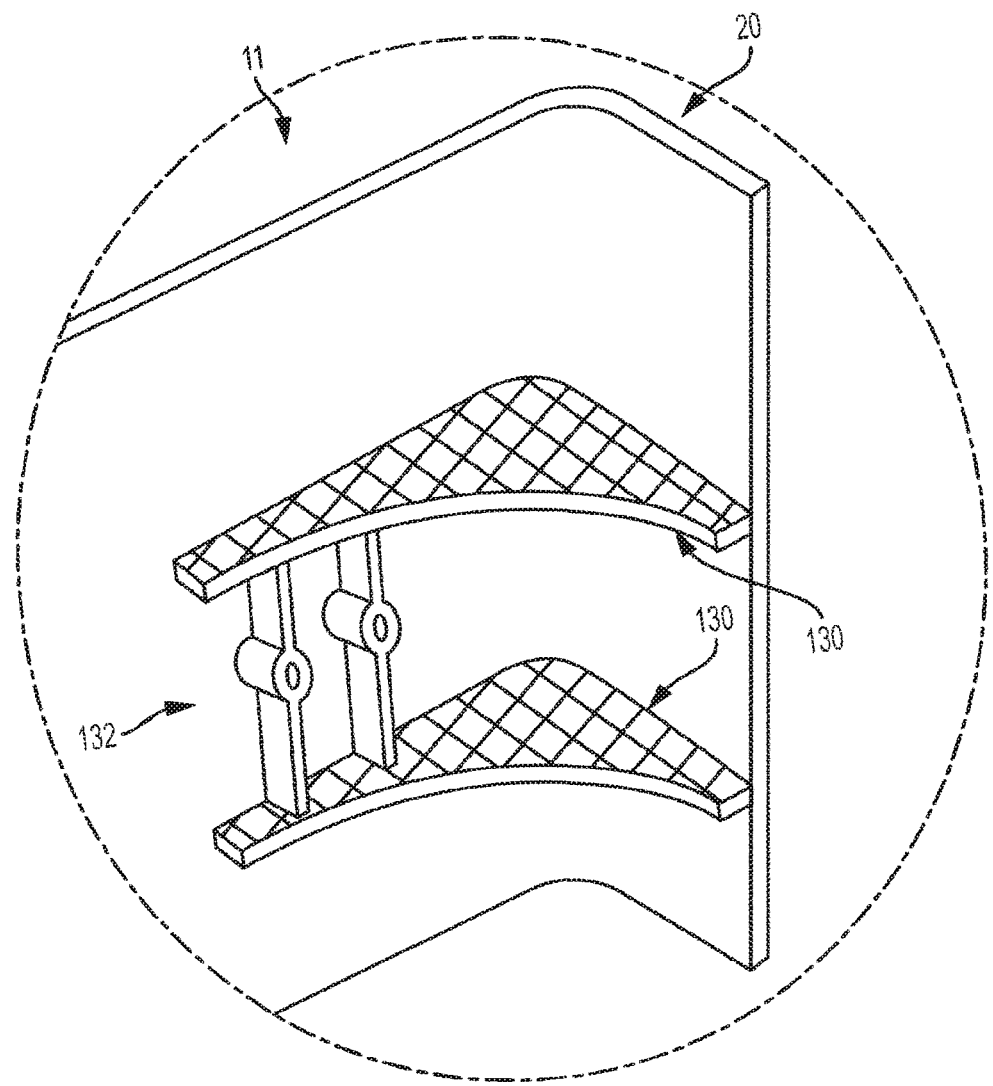
FIG. 3 is a detailed view of the seat back cover showing a thermoplastic support element according to an exemplary embodiment.

FIG. 3 is a detail of a portion of the seat back cover 10. Specifically, FIG. 3 illustrates exemplary thermoplastic support elements 130 which elements 130 are formed on the interior surface of the composite seat back structure 15. In a typical embodiment, one or more thermoplastic support elements 130 are formed on the interior surface, with a homogeneous connective interface between the thermoplastic support element 130 and the composite seat back structure 15. Similarly, an integral threaded insert boss 132, formed of thermoplastic, is formed on the interior surface of the composite seat back structure 15. In a typical embodiment, thermoplastic mounting elements (not shown) are similarly formed on the interior surface. In a typical embodiment, the thermoplastic elements 130 are molded such as, for example, via injection molding onto the composite seat back structure 15 to provide a homogeneous chemical interface. In some embodiments, the thermoplastic support elements 130 extends from the interior surface of the exterior face 11 to the interior surface of the side flange 20. In a typical embodiment, the thermoplastic support elements 130 are formed of thermoplastic without reinforcing fibers. In other embodiments, the thermoplastic support elements 130 are molded onto the composite seat back structure 15 with thermoplastic resin while having reinforcing fibers dispersed throughout the resin to provide additional strength. It should be noted, however, that any such fibers in thermoplastic resin during injection molding would not have the same precision of orientation and location as the weave of reinforcing fibers located in the composite material.

By way of example, typical thermoplastic support elements 130 typically comprise a thermoplastic material that is the same chemical composition as that of the layers 110 of composite. In some embodiments, the thermoplastic support elements 130 may also be reinforced with suitable fibers, for example carbon and/or graphite and/or glass and/or aramid fibers dispersed within the thermoplastic resin material during injection molding of the thermoplastic support elements onto the composite sheet material structure. The thermoplastic support elements may be thermally and/or homogeneously affixed to the composite sheet material structure, for example by chemical bonding. This forms a homogeneous connective interface, such that the seat back 10 as a whole is an integral unit bonded solidly together in a way that may enhance the overall strength of the seat back.

In some embodiments, the composite material of the seat back may be multi-layered. That is, the composite may be formed of two or more layers of composite as shown in FIG. 2. This layering of composites may provide additional structural support. While some embodiments may require multi-layered composite support throughout the element, in other embodiments one or more layers of composite may be used for most of the element, with additional layers used only in critical areas of the element requiring greater structural support. Typically, the multiple layers 110 of composite may be securely affixed such as, for example, fused together, as by ultrasonic welding, thermal staking, thermal welding, consolidation, homogeneously affixed, or other such joining means. In some embodiments, the multiple layers 110 of composite may be oriented so that the reinforcing fibers of each layer are oriented differently. By altering the fiber orientation of the layers 110, the joint composite may provide additional strength in some embodiments.

Figure 4A:
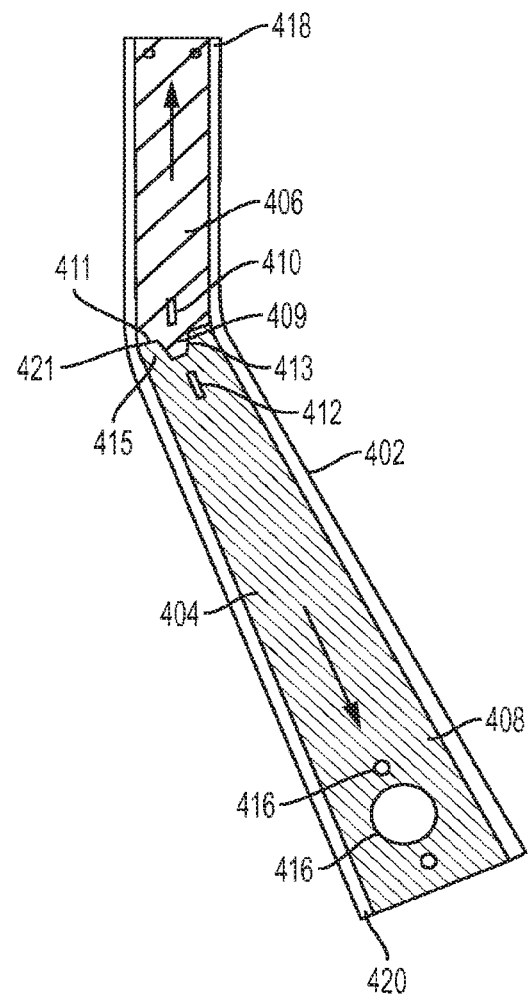
FIG. 4A is a cross-sectional view of a side rail of a seat back frame showing a molding core according to an exemplary embodiment.

FIG. 4A is a cross-sectional view of a side rail 402 of the seat back frame 102 showing a molding core 404. In a typical embodiment, the side rail 402 is a hollow tube constructed of a thermoplastic resin. In a typical embodiment, the side rail 402 has the shape of a square tube. However, in other embodiments, seat back frames according to principles of the invention may include side rails that have shapes such as, for example, circular, elliptical, oval, triangular, trapezoidal, or any other appropriate shape. In a typical embodiment, the side rail 402 is constructed of either the same thermoplastic material as the seat back cover 10 such that a homogenous chemical bond may be formed between the side rail 402 and the seat back cover 10. In various embodiments, the side rail 402 is formed of a thermoplastic material that is chemically compatible with the thermoplastic material of the seat back cover 10. Such a thermoplastic material may, in some embodiments, be different from that used to form the seat-back cover 10.

Still referring to FIG. 4A, the molding core 404 is utilized during manufacture of the side rail 402. The molding core 404 includes a first section 406 and a second section 408. A tongue 409 extends from an interior end 411 of the first section. A groove 413 is formed in an interior end 415 of the second section 408. In a typical embodiment, the tongue 409 is received within the groove 413 so as to facilitate connection of the first section 406 to the second section 408. A first core support 410 extends laterally from the first section 406 and a second core support 412 extends laterally from the second section 408. In various embodiments, the molding core 404 includes at least one application-specific mounting element 414. As shown in FIG. 4A, in a typical embodiment, the mounting element 414 includes at least one aperture 416.

Figure 4B:
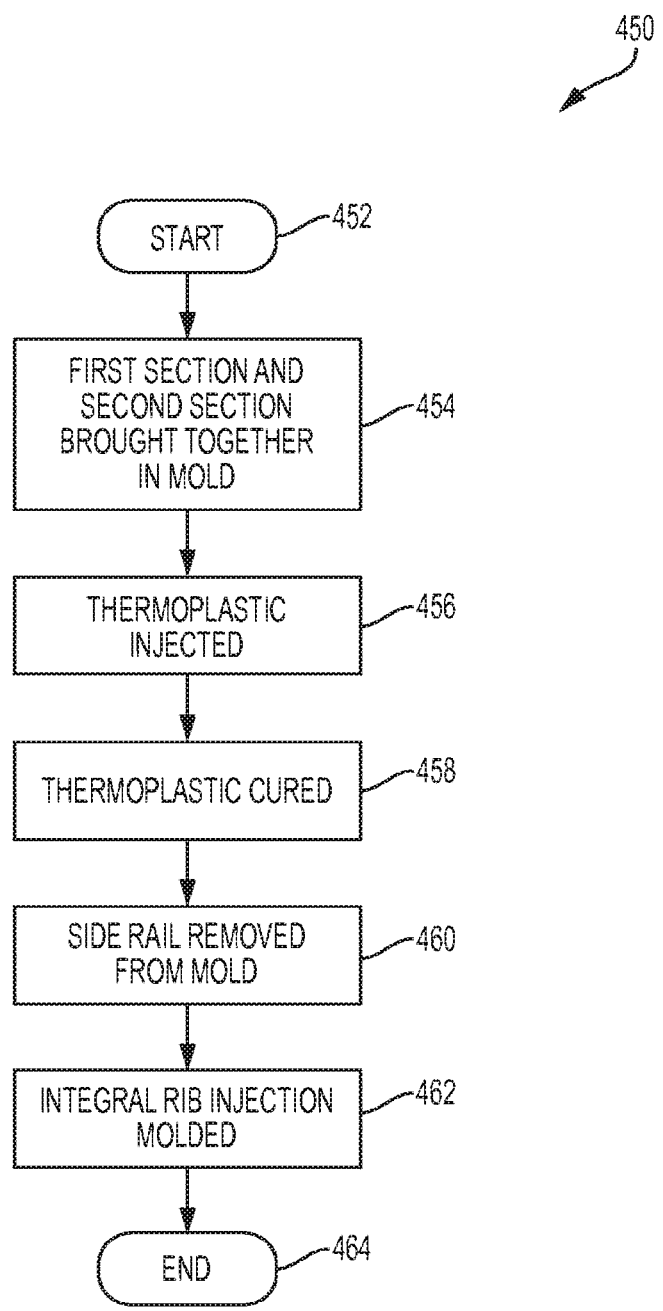
FIG. 4B is a flow diagram of a process for manufacturing the side rail of FIG. 4A according to an exemplary embodiment.

FIG. 4B is a flow diagram of a process 450 for manufacturing the side rail 402. The process 450 starts at step 452. At step 454, the first section 406 and the second section 408 are brought together inside a mold (not shown) such that the tongue 409 is received into the groove 413. After the first section 406 and the second section 408 are positioned, the first core support 410 and the second core support 412 contact the inner surface of the mold and stabilize the molding core 404. At step 456, thermoplastic resin is injected into an annular space between the mold and the molding core 404. In a typical embodiment, the thermoplastic resin is injected at a temperature and pressure sufficient to cause the thermoplastic resin to completely fill the annular space. The first core support 410 and the second core support 412 stabilize the first section 406 and the second section 408, respectively, and prevent deviation or movement of the molding core 404 during molding. At step 458, the thermoplastic resin is cured to form the side rail 402. At step 460, the cured side rail 402 is removed from the mold and the molding core 404 is removed from an interior of the side rail 402. In a typical embodiment, the first section 406 is withdrawn from a first end 418 of the side rail 402 and the second section 408 is withdrawn from a second end 420 of the side rail 402. In a typical embodiment, the first section 406 and the second section 408 are mechanically withdrawn prior to removal of the molding core 404 from the side rail 402.

Figure 4C:
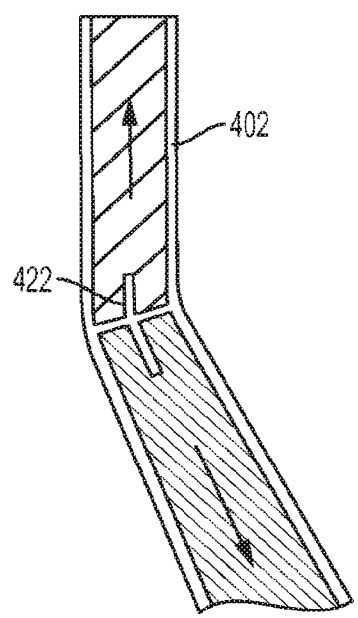
FIG. 4C is a cross-sectional view of the side rail of FIG. 4B showing an integral rib according to an exemplary embodiment.

FIG. 4C is a cross-sectional view of the side rail 402 showing an integral rib 422. Referring to FIGS. 4A-4C, the first core support 410 and the second core support 412 cause apertures to form in the side rail 402 proximate a junction 421 of the first section 406 and the second section 408. At step 462, an integral rib 422 is injection molded at the junction 421. The integral rib 422 fills the apertures and adds further support to the junction 421. The process ends at step 464.

Figure 5A:
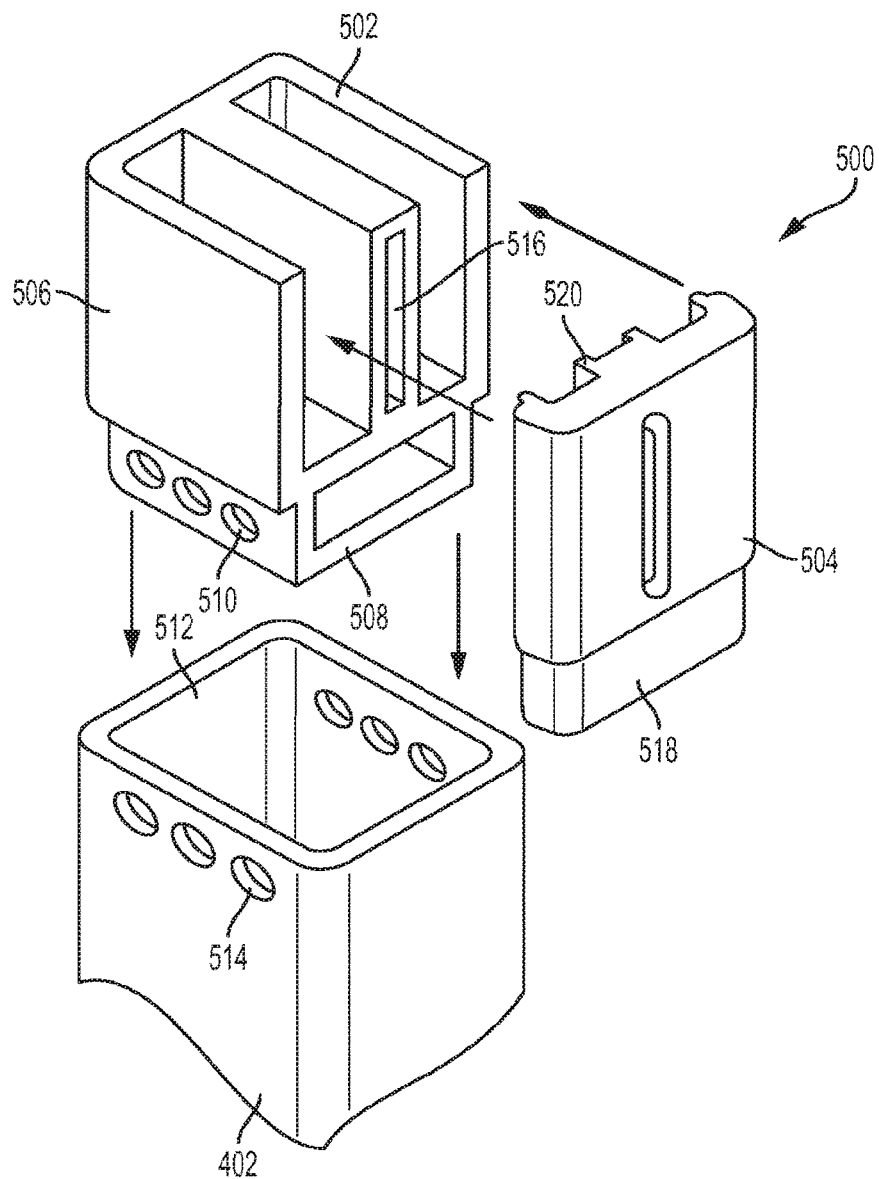
FIG. 5A is a detailed exploded view of a junction between a top rail main section, a side rail, and a top rail cap of a seat back frame according to an exemplary embodiment.

FIG. 5A is a detailed exploded view of a junction 500 between a top rail main section 502, the side rail 402, and a top rail cap 504 of the seat back frame 102. In a typical embodiment, the top rail main section 502 and the top rail cap 504 are formed of the same thermoplastic material as the side rail 402 thereby facilitating formation of a homogenous chemical bond between the top rail main section 502, the top rail cap 504, and the side rail 402. The top rail main section 502 includes a body 506. A plug 508 extends from the body 506 and a first plurality of apertures 510 are formed in a side of the plug 508. During assembly, the plug 508 is received into a socket 512 formed in the side rail 402 such that the first plurality of apertures 510 align in registry with a second plurality of apertures 514 formed in a side of the socket. In a typical embodiment, a fusing chamber 516 is formed in an interior of the top rail main section 502.

Still referring to FIG. 5A, the top rail cap 504 includes a plug 518 extending therefrom. A plurality of fusing miters 520 are formed on an interior side of the top rail cap 504. During assembly, the top rail cap 504 is aligned with the top rail main section 502 such that the plug 518 aligns with the plug 508. Once aligned, the fusing miters 520 align with the fusing chamber 516 to facilitate bonding of the top rail main section 502 to the top rail cap 504. The plug 518 and the plug 508 are received into the socket 512 such that the first plurality of apertures 510 align in registry with a second plurality of apertures 514.

Figure 5B:
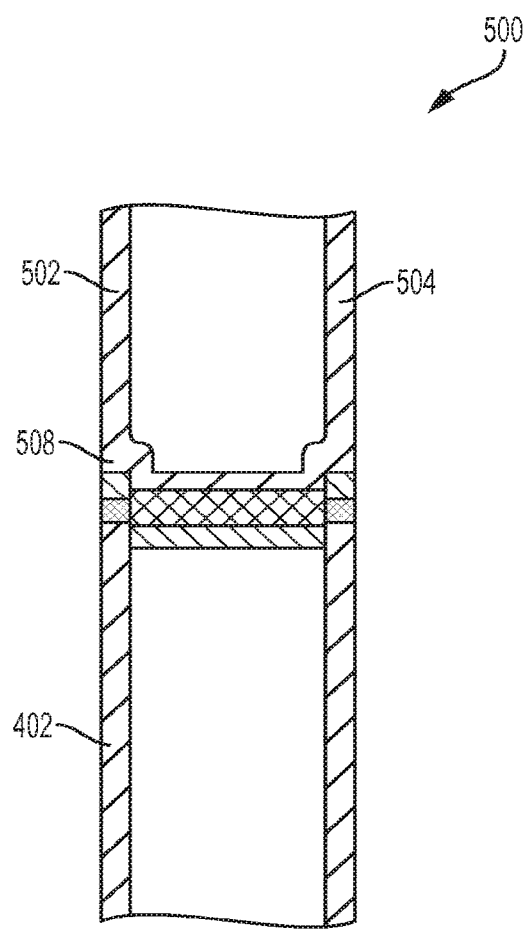
FIG. 5B is a cross sectional view of the junction of FIG. 5 according to an exemplary embodiment.

FIG. 5B is a cross-sectional view of the junction 500. Referring to FIGS. 5A and 5B together, after the side rail 402, the top rail main section 502 and the top rail cap 504 are aligned, chemically compatible thermoplastic material is then injected into the joint 500. The thermoplastic material enters and flows through the first plurality of apertures 510 and the second plurality of apertures 514. Further the thermoplastic material penetrates the fusing chamber 516 to facilitate formation of a homogenous chemical bond between the top rail main section 502 and the top rail cap. Thus, once assembled, the side rail 402, the top rail main section 502, and the top rail cap 504 are chemically bonded to form an integral unitary seat back frame 102. In a typical embodiment, bonding of the side rail 402, the top rail main section 502, and the top rail cap 504 occurs simultaneously with bonding of the seat back frame 102 to the seat back cover 10; however, in other embodiments, the bonding of the seat back frame 102 to the seat back cover 10 may occur separately.

Figure 6:
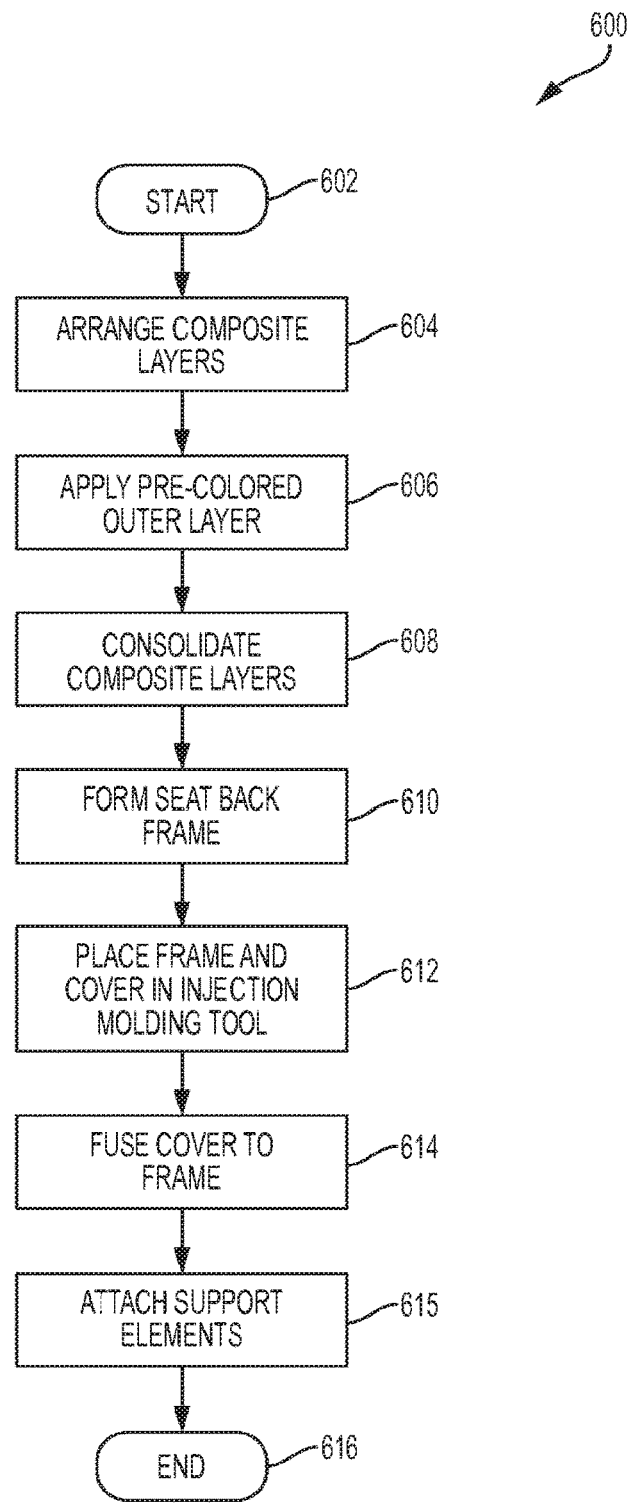
FIG. 6 is a flow diagram of a process for forming a homogenous integral seat back according to an exemplary embodiment.

FIG. 6 is a flow diagram of a process 600 for forming the seat back assembly 100. The process 600 begins at step 602. At step 604, the seat back cover 10 is formed by stacking multiple layers such as, for example, four layers, of composite sheets on top of each other. In a typical embodiment, each composite sheet includes a layer of reinforcing fibers surrounded by a thermoplastic film. At step 606, a pre-colored outer layer is applied to a top surface of the seat back cover 10 and an equal amount of uncolored film is applied to a bottom surface of the seat back cover 10. Application of the uncolored film eliminates undesirable curling of the composite sheets due to shrinkage differences in reinforced versus unreinforced materials. At step 608, a high-temperature press is utilized to consolidate the composite sheets to form the seat back cover 10. During consolidation, a textured surface is present on at least one press plate of the high-temperature press such that a texture pattern is applied to the pre-colored outer layer.

Still referring to FIG. 6, at step 610, the seat back frame 102 is formed. Step 610 includes joining the side rail 402, the top rail main section 502, and the top rail cap 504 in the manner described above. At step 612, the seat back frame 102 and the seat back cover 10 are inserted into an injection molding tool. At step 614, the seat back frame is injection molded to the seat back cover 10 such that homogenous chemical fusing of the side rail 402, the top rail main section 502, and the top rail cap 502 occurs and homogenous chemical fusing of the seat back cover 10 to the seat back frame 102 occurs. At step 615, any required thermoplastic support elements 130 are injection molded to the seat back assembly 100. The process 600 ends at step 616.

Figure 7:
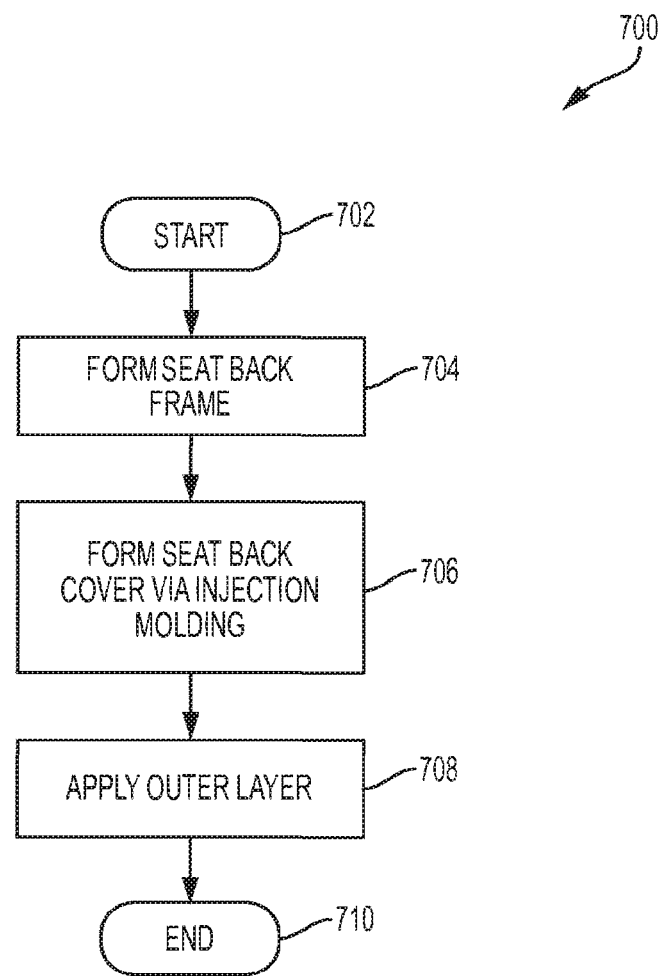
FIG. 7 is a flow diagram of a process for forming a homogenous integral seat back according to an exemplary embodiment.

FIG. 7 is a flow diagram of a process 700 for forming the seat back assembly 100. The process begins at step 702. At step 704, the seat back frame 10 is formed as described in step 610 discussed above. At step 706, the seat back cover 10 is formed via an injection molding process. In step 706, injection molding of the seat back cover 10 fuses the seat back cover 10 to the seat back frame 102. At step 708, an outer layer is applied to the seat back cover 10 via injection molding such that the outer layer is homogenously fused to the seat back cover. The outer layer may include at least one of color and texture. The process 700 ends at step 710.

Referring to FIGS. 7-8 together, in some applications, exposed reinforcing fibers are not acceptable. In such applications, the reinforcing fibers must be contained within a portion of the injected molded thermoplastic material. In some embodiments, an integrated thermoplastic positioning system can be utilized to support the reinforcing fibers. In a typical embodiment, the integrated thermoplastic positioning system can be molded onto the composite material in an injection molding process. The integrated thermoplastic positioning system thus provides precise positioning in the injection molding tool. An integrated thermoplastic positioning system is described in U.S. patent application Ser. No. 14/048,840, filed Oct. 8, 2013. U.S. patent application Ser. No. 14/048,840 is incorporated by reference herein in its entirety.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A method of forming a thermoplastic homogenous seat back assembly, the method comprising:
    forming a thermoplastic seat back cover;
    assembling a thermoplastic seat back frame;
    arranging the seat back frame on the seat back cover;
    forming a homogenous chemical bond between the seat back cover and the seat back frame; and
    wherein the assembling the seat back frame comprises:
        assembling a side rail to a top rail main section and a top rail cap;
        injecting thermoplastic material such that a homogenous chemical bond is formed between the side rail, the top rail main section, and the top rail cap.

2. The method of claim 1, wherein the forming the seat back cover comprises:
    shaping a first composite layer into a shape of a seat back cover;
    shaping a second composite layer into a shape of a seat back, the second composite layer being chemically compatible with the first composite layer; and
    applying at least one of heat and pressure to the first composite layer and the second composite layer to create a homogenous chemical bond between the first composite layer and the second composite layer.

3. The method of claim 2, wherein the shaping the first composite layer and the shaping sharing the second composite layer comprise forming a perimeter flange in the first composite layer and the second composite layer.

4. The method of claim 1, comprising applying an outer layer to at least one of the first composite layer and the second composite layer.

5. The method of claim 4, comprising applying at least one of color and texture to the outer layer.

6. The method of claim 1, wherein at least one of the first composite layer and the second composite layer comprise a plurality of reinforcing fibers oriented in a plurality of directions.

7. The method of claim 1, wherein the forming the seat back cover comprises utilizing injection molding.

8. The method of claim 1, wherein the forming the seat back cover comprises applying at least one of color and texture to the seat back cover.

9. The method of claim 1, wherein the forming the seat back cover comprises utilizing an integrated thermoplastic positioning system.

* * * * *

UNITED STATES PATENT AND TRADEMARK OFFICE
CERTIFICATE OF CORRECTION

PATENT NO. : 10,501,190 B2
APPLICATION NO. : 15/921423
DATED : December 10, 2019
INVENTOR(S) : William H. Maslakow Page 1 of 1

It is certified that error appears in the above-identified patent and that said Letters Patent is hereby corrected as shown below:

In the Claims

In Claim 3 at Column 12 Line 6 please remove the word -- sharing -- after the word "shaping".

Signed and Sealed this
Twenty-third Day of June, 2020

Andrei Iancu
*Director of the United States Patent and Trademark Office*